United States Patent
Chen

(10) Patent No.: US 7,944,543 B2
(45) Date of Patent: May 17, 2011

(54) LIQUID CRYSTAL LENS AND LENS MODULE INCORPORATING SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 392 days.

(21) Appl. No.: 12/198,298

(22) Filed: Aug. 26, 2008

(65) Prior Publication Data

US 2009/0262298 A1    Oct. 22, 2009

(30) Foreign Application Priority Data

Apr. 18, 2008   (CN) .......................... 2008 1 0301194

(51) Int. Cl.
*G02F 1/13* (2006.01)
*G02B 3/00* (2006.01)
*G02B 15/14* (2006.01)
(52) U.S. Cl. .................... 349/200; 359/654; 359/704
(58) Field of Classification Search .................. 349/200; 359/654, 704; 977/932
See application file for complete search history.

(56) References Cited

U.S. PATENT DOCUMENTS

| 7,489,381 B2* | 2/2009 | Sekiguchi ..................... 349/142 |
| 7,619,713 B2* | 11/2009 | Hashimoto .................... 349/200 |
| 7,630,040 B2* | 12/2009 | Liu et al. ....................... 349/123 |
| 2006/0198760 A1* | 9/2006 | Potyrailo et al. ........... 422/82.01 |
| 2006/0278866 A1* | 12/2006 | Star ................................. 257/17 |
| 2008/0136990 A1* | 6/2008 | Kimura ........................... 349/46 |

* cited by examiner

*Primary Examiner* — Mike Qi
(74) *Attorney, Agent, or Firm* — Andrew C. Cheng

(57) ABSTRACT

A liquid crystal lens includes a first light-pervious plate, a second light-pervious plate opposite to the first light-pervious plate, a liquid crystal layer sandwiched between the first light-pervious plate and the second light-pervious plate, a first electrode layer, a second electrode layer and a driving voltage chip. The first electrode layer includes a plurality of concentric, annular electrodes arranged on a surface of the first light-pervious plate. A material of the first electrode layer is carbon nanotube. The second electrode layer is arranged on a surface of the second light-pervious plate. The driving voltage chip is configured for providing voltages between each of the annular electrodes and the second electrode layer in radial gradient distribution. A lens module is also provided in the present invention.

14 Claims, 4 Drawing Sheets

US 7,944,543 B2

LIQUID CRYSTAL LENS AND LENS MODULE INCORPORATING SAME

CROSS-REFERENCE TO RELATED APPLICATIONS

This application is related to commonly-assigned copending application entitled, Liquid Crystal Lens and Lens Module Having Same, filed Aug.26, 2008, application Ser. No. 12/198,300 Disclosures of the above identified applications are incorporated herein by reference.

BACKGROUND

1. Technical Field

The present invention relates to lenses and, particularly, to a variable focal length, liquid crystal lens and a lens module incorporating the same.

2. Description of Related Art

At present, image pick-up devices such as video camera are widely used. The image pick-up device includes a lens module. The lens module is configured for focusing light onto an image sensor. The lens module includes lenses and a lens barrel for holding the lenses. A complicated bulky motor is used to move lenses during focusing.

What is needed, therefore, is a lens with a variable focal length and a lens module incorporating the same.

SUMMARY

In an exemplary embodiment of the present invention, a liquid crystal lens includes a first light-pervious plate, a second light-pervious plate opposite to the first light-pervious plate, a liquid crystal layer sandwiched between the first light-pervious plate and the second light-pervious plate, a first electrode layer, a second electrode layer and a driving voltage chip. The first electrode layer includes a plurality of concentric, annular electrodes arranged on a surface of the first light-pervious plate. A material of the first electrode layer is carbon nanotube. The second electrode layer is arranged on a surface of the second light-pervious plate. The driving voltage chip is configured for providing voltages between each of the annular electrodes and the second electrode layer in radial gradient distribution.

Other advantages and novel features of the present lens will become more apparent from the following detailed description of preferred embodiments, when taken in conjunction with the accompanying drawings.

BRIEF DESCRIPTION OF THE DRAWINGS

Many aspects of the present liquid crystal lens and lens module can be better understood with reference to the following drawings. The components in the drawing are not necessarily drawn to scale, the emphasis instead being placed upon clearly illustrating the principles of the present liquid crystal lens and lens module. Moreover, in the drawings, like reference numerals designate corresponding parts throughout the several views.

DETAILED DESCRIPTION OF PRESENT EMBODIMENTS

Embodiments of the present liquid crystal lens and lens module will now be described in detail below and with reference to the drawings.

Figure 1:
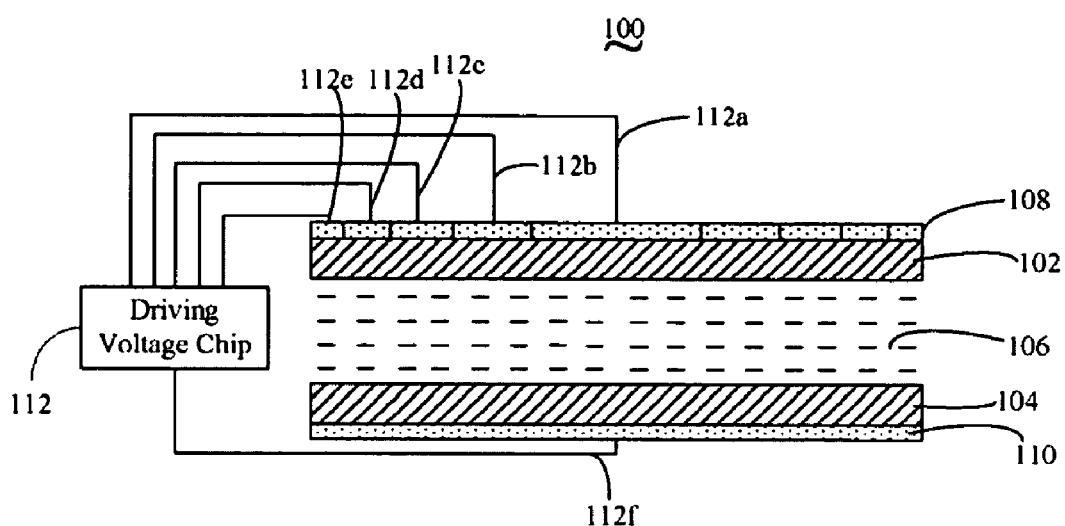
FIG. 1 is schematic, cross-sectional view of a liquid crystal lens in accordance with a first exemplary embodiment.

Referring to FIG. 1, a liquid crystal lens 100 is shown in accordance with a first exemplary embodiment. The liquid crystal lens 100 includes a first base plate 102, a second base plate 104, a liquid crystal layer 106, a first electrode layer 108, a second electrode layer 110 and a driving voltage chip 112. The liquid crystal layer 106 is filled between the first base plate 102 and the second base plate 104. In the exemplary embodiment, the first electrode layer 108 is arranged on one surface of the first base plate 102 facing away from the liquid crystal layer 106. The second electrode layer 110 is arranged on one surface of the second base plate 104 facing away from the liquid crystal layer 106.

A material of the first base plate 102 and the second base plate 104 is a light-pervious material, e.g. glass and plastic. Preferably, the material of the first base plate 102 is same as that of the second base plate 104. A thickness of the first base plate 102 and the second base plate 104 is in a range from about 0.1 millimeter (mm) to about 0.5 mm, and preferably from about 0.2 mm to 0.4 mm.

The first base plate 102 is located substantially parallel with the second base plate 104. The first base plate 102 is spaced apart from the second base plate 104 by a distance in a range from 10 microns to about 100 microns, and preferably from about 30 microns to 70 microns. The liquid crystal layer 106 is located between the first base plate 102 and the second base plate 104. If no voltage is applied between the first base plate 102 and the second base plate 104, the liquid crystal molecules of the liquid crystal layer 106 are oriented in parallel with the first base plate 102 and the second base plate 104.

Figure 2:
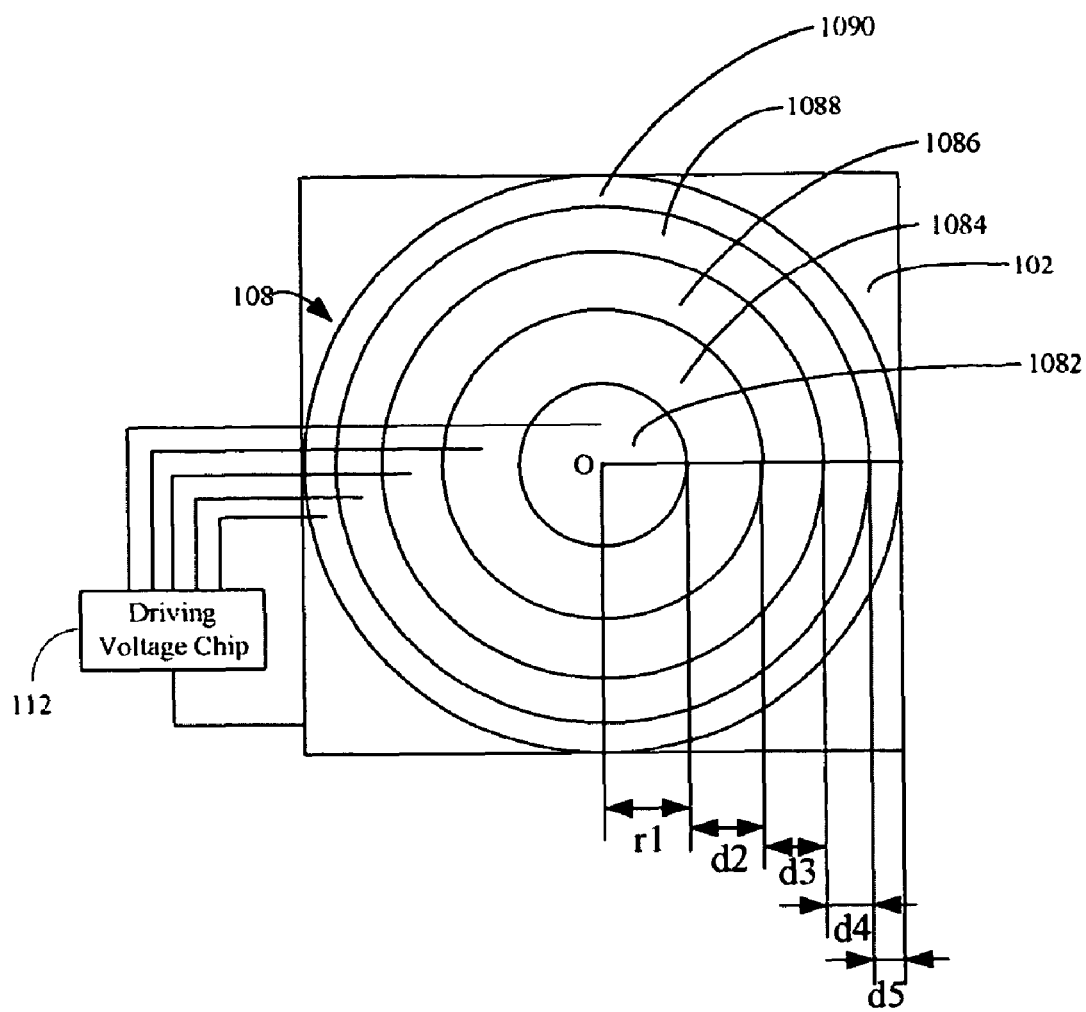
FIG. 2 is schematic, plan view of the liquid crystal lens in FIG. 1.

Referring to FIG. 2, the first electrode layer 108 includes a round electrode 1082 and four annular electrodes 1084, 1086, 1088, 1090 surrounding the round electrode 1082. The round electrode 1082 and the four annular electrodes 1084, 1086, 1088, 1090 are aligned in the order written outwardly from a center O. In practical use, a total number of the round electrode 1082 plus the annular electrodes 1084, 1086, 1088, 1090 may alter in the range from 5 to 20, and preferably in the range from 7 to 15. A thickness of the electrode layer 108 may be in the range from 50 nanometers to 500 nanometers, and preferably in the range from 100 nanometers to 300 nanometers.

The round electrode 1082 has a radius r1. The annular electrodes 1084, 1086, 1088, 1090 have widths d2, d3, d4, d5, respectively. Preferably, the radius r1 and the widths d2, d3, d4, d5 satisfy r1>d2>d3>d4>d5. In the exemplary embodiment, each two adjacent electrodes of the round electrodes 1082 and the annular electrodes 1084, 1086, 1088, 1090 substantially abuts against each other and is electrically insulated by insulating glue. In alternative embodiments, each two adjacent electrodes of the round electrodes 1082 and the annular electrodes 1084, 1086, 1088, 1090 may space apart from each other by a tiny space.

The second electrode layer 110 is a planar electrode. In use, voltages will be respectively applied between, the round electrode 1082 and the second electrode layer 110, the annular electrodes 1084 and the second electrode layer 110, the annular electrodes 1086 and the second electrode layer 110, the annular electrodes 1088 and the second electrode layer 110, and the annular electrodes 1090 and the second electrode layer 110.

A material of the first electrode layer 108 and the second electrode layer 110 is a carbon nanotube material. The carbon nanotube material can be selected from a group consisting of single-walled carbon nanotube, multi-walled carbon nanotube, single-walled carbon nanotube bundles, multi-walled carbon nanotube bundles and super-aligned multi-walled carbon nanotube yarns. The first electrode layer 108 is formed on the surface of the first base plate 102 by, but not limited to, a photo-mask process.

The driving voltage chip 112 has five cathode terminals 112*a*, 112*b*, 112*c*, 112*d* and 112*e*, and an anode terminal 112*f*. The five cathode terminals 112*a*, 112*b*, 112*c*, 112*d* 112*e* are electrically connected with the first round electrode 1082, the annular electrode 1084, 1086, 1088, 1090, respectively. The anode terminal 112*f* is electrically connected with the second electrode layer 110. The driving voltage chip 112 is configured for providing voltages respectively between the first round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110.

In operation, voltages are applied between the first electrode layer 108 and the second electrode layer 110 by the driving voltage chip 112. The voltages between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110, are controlled separately by the driving voltage chip. These voltages are distributed in radial gradient from the center O of the round electrode 1082, i.e. gradually larger or gradually smaller. All of the voltages are larger than a threshold voltage of the liquid crystal layer 106, so the liquid crystal molecules of the liquid crystal layer 106 between each of the round electrode 1082, the annular electrode 1084, 1086, 1088, 1090, and the second electrode layer 110 can be turned to form an angle between the liquid crystal molecules and the first base plate 102 or the second base plate 104. The angle between the liquid crystal molecules and the first base plate 102 or the second base plate 104 increases as the voltage applied to the liquid crystal molecules increases. Therefore, the liquid crystal molecules between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110, respectively, incline at different angles relative to the first base plate 102 or the second base plate 104. The angles are distributed in radial gradient from the center O of the round electrode 1082 due to radial gradient distribution of the voltages. All the voltages are preferably in a range from about 2 volts to about 100 volts, and further preferably in a range from 10 volts to 60 volts.

A refractive index of the liquid crystal layer 106 increases as the angle contained by the lengthwise orientation of the liquid crystal molecules of the liquid crystal layer 106 and the transmission direction of the light passing through the liquid crystal layer 106 increases. In the exemplary embodiment, the transmission direction of the light passing through the liquid crystal layer 106 is perpendicular to the first base plate 102 and the second base plate 104. When the lengthwise orientation of the liquid crystal molecules of the liquid crystal layer 106 is parallel with the transmission direction of the light passing through the liquid crystal layer 106, the refractive index of the liquid crystal layer 106 has a minimum value. When the lengthwise orientation of the liquid crystal molecules of the liquid crystal layer 106 is perpendicular to the transmission direction of the light passing through the liquid crystal layer 106, the refractive index of the liquid crystal layer 106 has a maximum value. Therefore, the refractive indexes of the liquid crystal layer 106 between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110, respectively, distribute in radial gradient, thus the liquid crystal lens 100 forms a gradient-index lens.

When the refractive indexes of the liquid crystal layer 106 decreases in radial gradient from the center of the round electrode 1082, the liquid crystal lens 100 is a positive lens. When the refractive indexes of the liquid crystal layer 106 increases in radial gradient from the center of the round electrode 1082, the liquid crystal lens 100 is a negative lens.

The driving voltage chip 112 controls the varying of voltages between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110, thus controls the varying of refractive indexes of the liquid crystal layer 106. Thus, the radial gradient of the refractive indexes can vary by varying the refractive indexes of the liquid crystal 106. The focal length of the liquid crystal lens 100 is determined by the radial gradient of the refractive indexes. Therefore, the focal length can vary by controlling the voltages respectively between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110.

It is understood that the round electrode 1082 can be replaced by an annular electrode. Under this situation, the liquid crystal lens 100 can form a gradient-index lens if voltages in radial gradient are applied to the liquid crystal molecules between the annular electrodes of the first electrode layer and the second electrode layer.

In the present embodiment, the focal length of the liquid crystal lens 100 is variable, so that there is no need for a motor to drive the lenses to move. When the liquid crystal lens 100 is applied to a lens module, the size of the lens module is reduced. Additionally, the carbon nanotube has a nanoscale size and has a good conductivity of light and electricity thus, the liquid crystal lens 100 applying the carbon nanotube as electrodes can be used in miniature optic-electronic products, for example a camera unit of a mobile phone.

Figure 3:
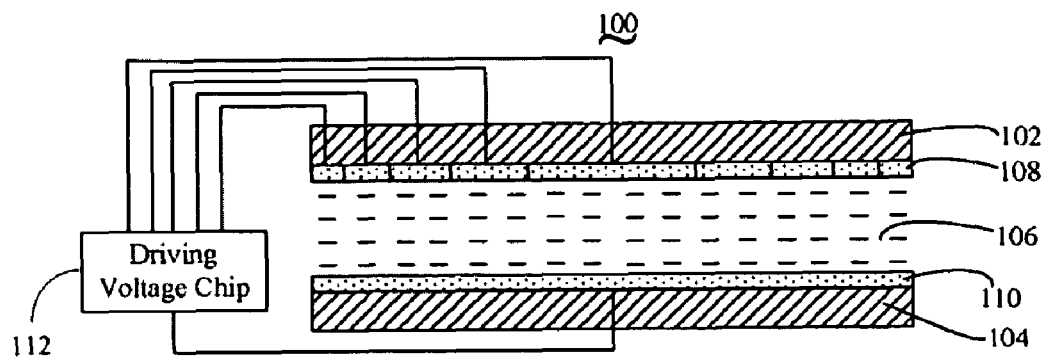
FIG. 3 is schematic, cross-sectional view of a liquid crystal lens in accordance with a second exemplary embodiment.

Referring to FIG. 3, a liquid crystal lens 200 is illustrated in accordance with a second exemplary embodiment. The distinguished features between the liquid crystal lens 200 and the liquid crystal lens 100 are that the first electrode layer 108 and the second electrode layer 110 are arranged on a surface of the first base plate 102 and a surface of the second base plate 104 facing towards the liquid crystal layer 106, respectively. In this exemplary embodiment, the first electrode layer 108 can also be arranged on the surface of the first base plate 102 facing away from the liquid crystal layer 106. Alternatively, the second electrode layer 110 can be arranged on the surface of the second base plate 104 facing away from the liquid crystal layer 106.

Figure 4:
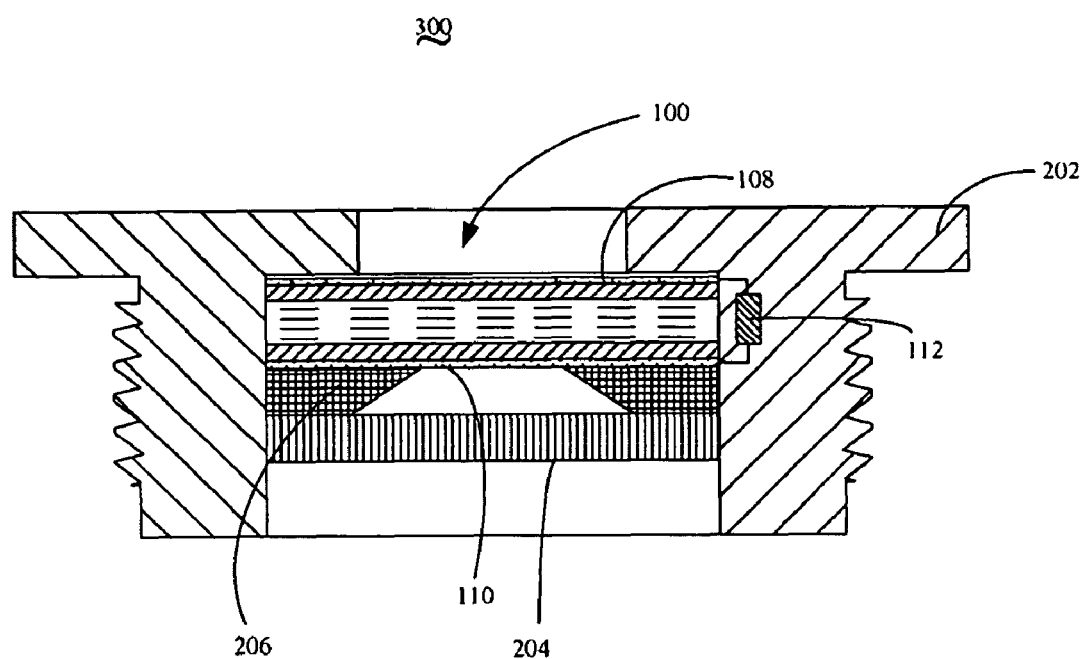
FIG. 4 is schematic, cross-sectional view of a lens module incorporating the liquid crystal lens in FIG. 1 in accordance with a third exemplary embodiment.

Referring to FIG. 4, a lens module 300 incorporating the liquid crystal lens 100 is illustrated in accordance with a third exemplary embodiment. The lens module 300 includes a lens barrel 202, a liquid crystal lens 100 and an infrared-ray cut filter 204. The liquid crystal lens 100 and the infrared-ray cut filter 204 are engagingly received in the lens barrel 202 and aligned in the written order. The liquid crystal lens 100 is spaced apart from the infrared-ray cut filter 204 by a spacer 206. The liquid crystal lens 100 includes a driving voltage chip 112. The driving voltage chip 112 is electrically connected with the first electrode layer 108 and the second electrode layer 110, respectively. The driving voltage chip 112 is configured for providing radial voltages gradient between the round electrode 1082 and the second electrode layer 110, the annular electrode 1084 and the second electrode layer 110, the annular electrode 1086 and the second electrode layer 110, the annular electrode 1088 and the second electrode layer 110, and the annular electrode 1090 and the second electrode layer 110, respectively. All of the voltages are larger than the threshold voltage of the liquid crystal layer 106. All the voltages are preferably in a range from about 2 volts to about 100 volts, and further preferably in a range from 10 volts to 60 volts.

In the lens module 300, there is no need for the motor to drive the lenses, thus the size of the lens module 300 is reduced.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A liquid crystal lens, comprising:
    a first light-pervious plate;
    a second light-pervious plate opposite to the first light-pervious plate;
    a liquid crystal layer sandwiched between the first light-pervious plate and the second light-pervious plate;
    a first electrode layer comprising a plurality of concentric, annular electrodes arranged on a surface of the first light-pervious plate, a material of the first electrode layer being carbon nanotubes;
    insulating glue, each two adjacent annular electrodes being electrically insulated by the insulating glue;
    a second electrode layer arranged on a surface of the second light-pervious layer; and
    a driving voltage chip for providing voltages between each of the annular electrodes and the second electrode layer, the voltages applied thereto being in radial gradient distribution.

2. The liquid crystal lens as claimed in claim 1, wherein the first electrode layer further comprises a round electrode concentric with the plurality of annular electrodes, a diameter of the round electrode being smaller than the interior diameter of the annular electrode adjacent to the round electrode.

3. The liquid crystal lens as claimed in claim 1, wherein the plurality of annular electrodes decreases gradually in width from a center to a periphery of the first electrode layer.

4. The liquid crystal lens as claimed in claim 2, wherein the total number of the round electrode and annular electrodes is in the range from 5 to 20.

5. The liquid crystal lens as claimed in claim 1, wherein the total number of the round electrode and annular electrodes is in the range from 7 to 15.

6. The liquid crystal lens as claimed in claim 1, wherein a thickness of the first electrode layer is in the range from 50 nanometers to 500 nanometers.

7. The liquid crystal lens as claimed in claim 1, wherein a thickness of the first electrode layer is in the range from 100 nanometers to 300 nanometers.

8. The liquid crystal lens as claimed in claim 1, wherein each of the voltages is in the range from 2 volts to 100 volts.

9. The liquid crystal lens as claimed in claim 1, wherein each of the voltages is in the range from 10 volts to 60 volts.

10. The liquid crystal lens as claimed in claim 1, wherein the carbon nanotube is selected from a group consisting of single-walled carbon nanotube, multi-walled carbon nanotube, single-walled carbon nanotube bundles, multi-walled carbon nanotube bundles and super-aligned multi-walled carbon nanotube yarns.

11. A lens module, comprising:
    a lens barrel; and
    a liquid crystal lens received in the lens barrel, the liquid crystal lens comprising:
        a first light-pervious plate;
        a second light-pervious plate opposite to the first light-pervious plate;
        a liquid crystal layer sandwiched between the first light-pervious plate and the second light-pervious plate;
        a first electrode layer comprising a plurality of concentric, annular electrodes arranged on a surface of the first light-pervious plate, a material of the first electrode layer being carbon nanotube;
        insulating glue, each two adjacent annular electrodes being electrically insulated by the insulating glue;
        a second electrode layer arranged on a surface of the second light-pervious plate; and
        a driving voltage chip for providing voltages between each of the annular electrodes and the second electrode layer, the voltages having a radial gradient distribution.

12. The lens module as claimed in claim 11, wherein the first electrode layer further comprises a round electrode concentric with the plurality of annular electrodes, a diameter of the round electrode is smaller than the interior diameter of the adjacent annular electrode.

13. The lens module as claimed in claim 11, wherein the plurality of annular electrodes decreases gradually in width from a center to a periphery of the first electrode layer.

14. The lens module as claimed in claim 11, wherein the carbon nanotube is selected from a group consisting of single-walled carbon nanotube, multi-walled carbon nanotube, single-walled carbon nanotube bundles, multi-walled carbon nanotube bundles and super-aligned multi-walled carbon nanotube yarns.

* * * * *